Patented Oct. 14, 1952

2,614,051

UNITED STATES PATENT OFFICE 2,614,051

ROOFING GRANULES AND METHOD OF MAKING SAME

Maurice E. Buzzell, Mahtomedi, Minn., and Lauren W. Kanninen, Wausau, Wis., assignors to Minnesota Mining & Manufacturing Company, St. Paul, Minn., a corporation of Delaware No Drawing. Application May 19, 1947, Serial No. 749,076

18 Claims. (Cl. 117—27)

This invention concerns improvements in the manufacture of artificially colored granules and more particularly artificially colored roofing granules intended for use in the decoration and protection of asphalt roofing, siding or the like.

Methods have long been known for the artificial coloring of roofing granules, consisting of crushed and screened minerals, in which the granules are coated with a suitable pigment in an inorganic bond. Preferably this bond is water-insoluble and highly adherent to the base granule. In carrying out these processes the granules are mixed with a pigment and a soluble silicate solution until a thorough coating of the granules is obtained, and the soluble silicate is then insolubilized. The soluble silicate, usually sodium silicate, is converted into the insoluble state by subjecting the coated granules to heat treatment, e. g. roasting temperatures; by chemical action, or by a combination of chemical action and heat treatment. The present invention relates to insolubilization of the silicate by chemical action and the silicate coated granules are heated at low temperatures to dry the silicate coating prior to the addition of the neutralizing or insolubilizing agent. Insolubilization of the silicate coatings at low temperatures affords marked advantage over the high temperature processes, not only in respect to lower fuel cost but also in widening the choice of pigments that may be used and in permitting the employment of certain pigments, such as organic pigments, which are deleteriously affected at high temperatures.

Many attempts have been made to produce artificially colored roofing granules by methods employing a chemical agent to neutralize or insolubilize the soluble silicate binder under lower temperature conditions. These attempts have included adding reactants to the silicate solution to render the silicate insoluble and weatherproof but they have been generally unsuccessful and most of the granules so produced have not been acceptable to the roofing manufacturers. These attempts have generally involved the addition of an acidic material to a soluble silicate, either before, during or after the application of the mixture of silicate and pigment to the mineral granule, in order to obtain a reaction between the acidic material and the alkaline portion of the silicate either by allowing the coated granule to stand at room temperature for a sufficient time or by heating to a moderate temperature.

Granules produced by these methods have been found wanting in one or more properties required in roofing granules by roofing manufacturers. In some cases, as when zinc chloride or magnesium chloride is used as the insolubilizing agent, the surface is found to be dull, cloudy or to have a white haze, which may be due to the formation of a thin film of zinc or magnesium oxide. In other cases, as when aluminum sulfate or any soluble sulfate is employed as the neutralizer, a soluble residue, such as sodium sulfate, is produced in the coating in sufficient quantities to cause objectionable "blooming" when the granules are applied to asphalt shingles and exposed on a roof.

Further, the requirement that the amount of soluble material in the granule coating be very low is exceedingly important since, if the granule coatings contain soluble salts in amounts exceeding approximately 10 pounds per ton of granules, it is very difficult to prevent granule loss from the surface of bituminous roofing during the shingle manufacturing stage. For example, in the production of bituminous roll roofing and asphalt shingles, the colored surfacing and asphalt shingles are applied to the surface of the coated granules are applied to the surface of the heated asphalt-coated fibrous sheet material and are pressed into place by rollers. Water is then sprayed over the sheet to cool and harden the asphalt binder prior to cutting and packing the finished roofing. If considerable portions of water-soluble salts are present in the granule coatings, it will be apparent that during the spray cooling operation and also when the roofing is subjected to rainfall when it is placed in use, the presence of the water-soluble material will prevent the formation and maintenance of a firm and effective bond between the asphalt and the granules, since the water tends to form a film around the individual granules due to their normally hydrophilic nature.

This requirement that water-soluble materials be substantially eliminated from roofing granule coatings has prevented extensive commercial use of prior art "pickling" or chemical treatment methods on silicate granule coatings, in which granule coatings were produced that contained a soluble residue of the order of twelve pounds or higher per ton of granules. Salts, such as calcium chloride, and weak acids, which have been used as insolubilizers, are not sufficiently acidic to neutralize adequately the alkaline content of the soluble silicate. Removal of the water-soluble component of the granule coating by prolonged and costly leaching and the subsequent drying of the granules is too expensive for commercial operations.

Among the objects of my invention are the production of granules which do not have the above-listed undesired properties and thus are substantially non-blooming and free of a dull film coating. Other important objects are the production of artificially colored roofing granules of high color strength which are light-fast and resistant to natural weathering due to their high bonding characteristics to asphalt or other organophilic plastic bonding material; the production of a weather-resistant inorganic bond which can be used with heat sensitive pigments; and the production of a roofing granule having high color strength and a high degree of color dispersion produced by the use of smaller amounts of bonding material per ton of granules than in the methods of the art.

In accordance with the invention, artificially colored roofing granules may be produced having a high intensity of color and a wide variety of shades. The colored coatings have density and permanence and are firmly bonded to the base granule. They are substantially water-insoluble and non-alkaline, and the granules retain their attractive appearance and firm bond to the plastic stratum under severe weathering conditions. The liquid or viscous coating compositions employed in making the improved artificially colored granules may be applied to the base granules under quite widely varying conditions without premature thickening or loss of film-forming properties of the pigment-containing composition. Low temperatures are employed to dry the coated granules and thus various heat-sensitive pigments, such as the phthalocyanines and other organic pigments may be employed in the production of artificially colored roofing granules according to this invention.

These several advantages, both in the process and in the resulting product, are obtained by insolubilizing the dried, silicate coating composition with aluminum chloride or with mixtures of aluminum chloride and ammonium chloride and a granule coating is produced in which the soluble residue is well within commercially acceptable limits. Furthermore, granules so produced have a denser (less porous) pigmented film than granules produced by insolubilization of the silicate coating by salts known to the art. Our granules do not have the dull hazy film characteristic of the granules of these prior art methods.

We have found that by employing aluminum chloride with or without ammonium chloride or boric acid, as the insolubilizer for the silicate solution, that we are able to obtain a coating, having the permanence and non-porous properties of coatings formed by a heat treatment, in which the water-soluble residue is less than 5–7 pounds per ton of coated granules. By following the coating procedure disclosed herein we have made the surprising discovery that the amount of sodium silicate employed per ton of granules may be reduced from the customary 50–80 pounds to 20–30 pounds. Thus a roofing granule coating of high color strength and intensity that is free of objectionable amounts of water-soluble salts is obtained at a considerable saving in the cost of raw material.

For example this result may be obtained by first mixing one ton of granules, that have been previously cleaned and pre-heated, with the pigment and a solution of 25 pounds of sodium silicate. The amount of sodium silicate of the type described may be varied between 20 and 30 pounds per ton. If more than 35 pounds per ton is used it is exceedingly difficult to prevent the formation of excessive amounts of water-soluble residues in the coating. If less than approximately 20 pounds of sodium silicate is employed, it is difficult to apply an effective mixture of pigment and binder to the granules.

After the granules are dried and more completely dehydrated by heating to temperatures of approximately 400° F., three pounds of aluminum chloride and one pound of boric acid are applied to the granules to neutralize the soda content of the silicate. Aluminum chloride is preferably sprayed upon the heated granules in a 30 percent solution, e. g. 32° Bé. We have found that if more than approximately 5 pounds of aluminum chloride are used with the quantities of sodium silicate, as set forth, a hydroscopic granule coating is obtained which becomes wet under humid weather conditions. Thus artificially colored roofing granules having a high intensity of color in a wide variety of shades may be produced at lower costs than may be obtained in accordance with the methods of the art. Furthermore the colored coatings are firmly bonded to the base granule and are substantially water-insoluble and non-alkaline. A very dense coating is obtained which adheres well to asphalt roofing.

Aqueous sodium silicate is the preferred alkali silicate, due to its availability and economy, although equivalent materials such as potassium silicate may likewise be used. The preferred grade of sodium silicate has a ratio of $Na_2O$ to $SiO_2$ of 1:2 up to 1:3.25, e. g. a silicate having a ratio of $Na_2O$ to $SiO_2$ of 1:2.84, a gravity of 47° Baumé, and a solids content of 40–42 percent. A commercial example of a sodium silicate of this type is the "K" brand sodium silicate currently sold by the Philadelphia Quartz Company. Variations in the alkalinity of the silicate are permissible, but increased alkalinity raises the requirements of the insolubilizer and provides in some cases a small percentage of undesirable soluble alkali in the final product, while increased $SiO_2$ content reduces the film-forming properties, as well as the concentration, of the silicate.

As a base granule we have found that we are able to use any of a rather wide class of relatively porous or relatively non-porous and weather-resistant rock or minerals. Examples of relatively porous material are trap rocks and slates. Examples of relatively non-porous rocks or minerals are argillite or greystone (such as the large greystone deposits located about five miles north of Wausau, Wisconsin), greenstone, quartz or quartzite, certain granites, etc. Normally it is preferred to employ the relatively non-porous rocks, although even these rocks have a substantial porosity as compared with our finished coatings.

In preparing artificial colored roofing granules in accordance with the invention, the natural mineral is crushed and screened to the desired size e. g. so as to pass a "10-mesh" screen and be retained on a "35-mesh" screen. The granules are then heated to a temperature of approximately 110–130° F. and are then mixed with the sodium silicate solution and pigment in a suitable mixer, such as an ordinary concrete mixer or other tumbling-barrel type of mixer, dried with minimum agitation as, for example, in a rotary kiln at a temperature above 250° F. but below 600° F., preferably about 400° F., to more completely dehydrate the silicate coating. The colored silicate film is now very dense and tough. While the granules are at an elevated temperature of approximately 350° F., the solution of aluminum chloride or a mixture of aluminum chloride, ammonium chloride and boric acid is applied to the hot granules, as by spraying. The granules are then cooled and may then be treated with a paraffin oil, linseed oil or any other granule treatment known to the roofing art, for example, such as that disclosed in U. S. Patent No. 2,164,329 granted July 4, 1939, to Clifford L. Jewett.

The following preferred formulas have been employed for the production of green and buff colored surface-coated roofing granules:

Formula No. 1—Green

| | Pounds |
|---|---|
| Granules | 2000 |
| Chromium oxide | 10.0 |
| Ferrite yellow (a yellow iron hydrate pigment) | 1.0 |
| Green phthalocyanine paste (20 percent solids) | 2.0 |
| Sodium silicate solution, 47° Baumé (ratio of silicate to soda 2.84) | 22.0 |
| Aluminum chloride (solids basis) | 1.2 |
| Ammonium chloride (solids basis) | 1.2 |
| Boric acid | .5 |

Formula No. 2—Buff

| | Pounds |
|---|---|
| Granules | 2000 |
| Titanium oxide | 10.0 |
| Ferrite yellow (a yellow iron hydrate pigment) | 12.0 |
| Iron oxide | 1.0 |
| Sodium silicate solution, 47° Baumé (ratio of silicate to soda 2.84) | 30.0 |
| Aluminum chloride (solids basis) | 3.0 |
| Boric acid | .6 |

Other pigments may be substituted for the pigments of the above formulas to produce granules of colors other than green or buff; for example, iron oxide may be employed if a red granule is desired, etc.

It is likewise to be understood that the insolubilizing agents of the above formulas may be interchanged, i. e. the solution of aluminum chloride and boric acid of Formula No. 2 may be employed in producing green granules of Formula No. 1. In this case if 22 pounds of sodium silicate, as set forth in Formula No. 1, is employed, it is desirable to reduce the amount of aluminum chloride from the 3 pounds specified in Formula No. 2 to approximately 2.4 pounds. Thus it is apparent that the foregoing examples are illustrative only and that the amounts of silicate and insolubilizing agents may be varied within the permissible range previously set forth. Likewise it is apparent that ammonium chloride and/or boric acid may be omitted from the insolubilizing solution. If such solutions include ammonium chloride, it is preferable that the amount of ammonium chloride employed does not exceed the aluminum chloride content of the solution. Small amounts of boric acid in 3 percent solution may be employed with the aluminum chloride and/or ammonium chloride as a safety factor against "blooming."

In coating one ton of granules according to the above formulae we have found the following procedure to be most satisfactory.

A slurry of sodium silicate, water and pigment is first made and is coated on the granules in a suitable mixer such as a tumbling-barrel type of mixer. The granules are fed to the mixer at 90°–130° F., preferably about 110° F., and the mixer is continued in operation until the granules are completely and uniformly coated with the pigment-silicate suspension. Air is circulated through the mixer to dry the granules; the partial drying may require five to ten minutes. The granules are then fired, preferably in a rotary kiln at a temperature of 350°–400° F., which temperature is normally maintained for from about five to twenty minutes depending on the size of the kiln and other factors, to more completely dehydrate the silicate coating.

In drying the granules it is extremely important that they be dried with the least possible amount of agitation in order to produce a film on the surface which is dense and strong. In the event the film of silicate is unduly disturbed during drying a light dusty powdered coating will result. We have found that the installation of lifter flights which lift the wet granules up to the top of the kiln and drop them through the kiln gases will produce granules having a dense and non-porous surface coating. Drying appears to take place so rapidly that the structure of the coating is not disturbed to any substantial extent and carbon dioxide is not absorbed from the kiln gases.

The aforementioned lifter flights may take the form of angle irons welded to the inside periphery of the rotary kiln and extending longitudinally thereof. These angle irons pick up granules and, as the kiln rotates, they are carried up to the top of the kiln and are gradually spilled out, providing the desired contact with the hot gases of the kiln without unduly disturbing the granule coatings. The angle irons or equivalent may be arranged helically, instead of longitudinally, where desired. This is often done at the feed end of the kiln so as to speed up the longitudinal movement of the granules along that section of the kiln. The granules progress through the kiln countercurrent to the kiln gases. The gases may be other than flue gases where desired, and may be substantially free of carbon dioxide. For example, the gases may be hot air.

The colored silicate coating film is now very dense and tough and the granules are then fed into a cooler, for example, a rotary tube type of cooler. As the hot granules start through the cooler, an insolubilizer solution of the type previously described and set forth in the above formulae is applied to the granules to neutralize the soda content of the silicate. The residual heat in the granules is at this point more than sufficient to evaporate the water thus added and also to remove any ammonia liberated from the ammonium chloride in solutions including ammonium chloride. At the discharge end of the cooler, lifter flights of the type described pick up the granules to allow the air being drawn into the cooler to dry them completely. The granules are then oiled for the purpose of increasing their adherence to asphalt in the presence of water; for this purpose the oil may contain a silane or other suitable resin. A treatment adapted to produce the desired organophilic granule surface is disclosed in U. S. Patent No. 2,164,329, granted July 4, 1939, to Clifford L. Jewett.

The above compositions have been described as suitable for the coating of greystone, quartzite and similar dense granules of a particular particle size range. It will be obvious that many other varieties and sizes of granules may be substituted, and that modifications in solids content, pigment content, total amount of coating composition and insolubilizer, etc. may be made within the limits set forth, depending on the total surface area, porosity, color, reactivity and other properties of such substituted granules. It is apparent that the improved coating processes may be used for the surface coating of heat-sensitive granules or other objects. Granules, or even tile or slabs or the like, e. g. asbestos, Portland cement compositions, or other flat sheeted pre-formed calcinable calcareous lithic cement slabs may similarly be given an insoluble, well bonded neutral, inorganic surface coating while remaining substantially free from the effects of destructive calcination.

The artificially colored roofing granules produced by applying a pigment and silicate coating of approximately 25 pounds of sodium silicate solution, 47° Baumé or potassium silicate per ton of granules and by insolubilizing the silicate coating with approximately three pounds of aluminum chloride, or of a mixture of aluminum chloride and ammonium chloride, when coated on a plastic stratum, such as asphalt, in the manufacture of bituminous roofing, have been found to provide a permanently adherent surfacing for the roofing.

What we claim is:

1. Process for applying a colored coating to granules in the manufacture of roofing granules which comprises warming the granules to a temperature above room temperature, then applying to the granules a mixture comprising a pigment and an aqueous alkali silicate in amounts of the order of twenty-five pounds of silicate solution, of approximately 40-42% solids, per ton of granules to be coated, drying and dehydrating the silicate at temperatures not above 600° F., and applying an aqueous solution of aluminum chloride, in amounts of approximately three pounds of aluminum chloride per ton of granules, to the granule coating while said granules are above room temperature.

2. The method of applying a colored coating to the surface of mineral granules in the manufacture of roofing granules which comprises coating the surface of the granules with a film-forming composition of a pigment and an aqueous solution of an alkaline silicate, said silicate being employed in amounts not in excess of approximately 15 pounds of silicate on a dry basis per ton of granules, and not less than approximately 8 pounds of silicate on a dry basis, and then applying a neutralizing solution to the surface of the coated granules, said solution consisting of a mixture of aluminum chloride and ammonium chloride in amounts of approximately 4 pounds on a dry basis per ton of granules.

3. The method of artificially coloring granules in the manufacture of roofing granules comprising coating the surface of the granules with a pigment and an inorganic bond, said bond comprising not more than 35, and not less than 20, pounds of sodium silicate solution 47° Baumé per ton of granules, partially drying said surface coating and then spraying the granules with an aqueous solution of aluminum chloride and ammonium chloride and later with an aqueous solution of boric acid, said aluminum chloride being present in amounts not in excess of approximately five pounds, on a dry basis, per ton of granules, said ammonium chloride being present in amounts not greater than the amount of aluminum chloride employed and said boric acid being present in lesser amounts.

4. Artificially colored roofing granules comprising a mineral base coated with a bloom-resisting water-insoluble surface coating, said coating including a pigment and alkaline silicate insolubilized in accordance with the method defined in claim 1.

5. Artificially colored roofing granules having a well-bonded, substantially non-alkaline and non-blooming colored surface coating comprising a pigment and an inorganic bond, said surface coating being applied by the method defined in claim 2.

6. Artificially colored roofing granules having a well-bonded, substantially non-alkaline, non-blooming colored surface coating comprising a coloring agent and an inorganic bond, said coating being applied to the granules by the method defined in claim 3.

7. The method of applying a colored coating to the surface of mineral granules in the manufacture of roofing granules which comprises coating the surface of the granules with a film-forming composition of a pigment and an aqueous solution of an alkali silicate, said silicate being employed in amounts within the range of approximately 8-15 pounds of silicate on a dry basis per ton of granules, drying the silicate coating, and then applying a neutralizing solution of aluminum chloride to the surface of the coated granules, said aluminum chloride being present in amounts not in excess of five pounds on a dry basis per ton of granules.

8. The method of artificially coloring granules in the manufacture of roofing granules comprising coating the surface of the granules with a film-forming composition of a pigment and a sodium silicate solution, said solution comprising not more than approximately fifteen pounds, and not less than approximately eight pounds, of sodium silicate solids per ton of granules, partially drying said surface coating, and then spraying the granules with an aqueous solution of aluminum chloride and ammonium chloride, said aluminum chloride not being in excess of approximately five pounds on a dry basis, per ton of granules.

9. The method of applying a colored coating to the surface of granules comprising coating the granules with a fluid film-forming composition comprising a pigment and an aqueous solution of sodium silicate, said sodium silicate being present in said solution in amounts within the range of 8-15 pounds on a dry basis per ton of granules, heating the coated granules to dry them, and then spraying the granules with a solution of a aluminum chloride and boric acid while the granules are above room temperature, the aluminum chloride not being in excess of approximately five pounds of aluminum chloride on a dry basis per ton of granules.

10. Artificially colored roofing granules having a well-bonded, substantially non-blooming and non-alkaline colored surface coating applied in accordance with the method set forth in claim 7.

11. Mineral granules having a well-bonded artificially colored surface coating, said coating being applied in accordance with the method defined in claim 8.

12. Artificially colored roofing granules having a well-bonded, substantially non-alkaline colored surface coating comprising a pigment and an inorganic bond, said surface coating being applied by the method defined in claim 9.

13. A composite sheet body for roofing and siding comprising a plastic stratum and an adherent surfacing for the same, consisting of artificially colored granules as defined in claim 10.

14. A composite sheet body for roofing and siding comprising a plastic stratum and an adherent surfacing for the same, consisting of artificially colored granules as defined in claim 11.

15. The method of applying a colored coating to granules in the manufacture of roofing granules comprising coating the base granules with a fluid film-forming composition comprising a pigment and an aqueous solution of an alkaline silicate in amounts of the order of 20-35 pounds of solution per ton of granules and of the order of 47° Baumé, drying the coated granules by heating them to a temperature not in excess of 600° F., applying an aluminum chloride solution to the granules while they are at an elevated temperature, said solution containing aluminum chloride solids in an amount not in excess of five pounds per ton of granules to be coated, and cooling the coated granules.

16. The method of applying a colored coating to the surface of granules comprising coating the granules with a fluid, film-forming composition comprising a pigment and an aqueous solution of sodium silicate of approximately 40-42% solids, said solution being employed in amounts of the order of 20-35 pounds per ton of granules, heating the coated granules to dry them, and spraying an aqueous solution of aluminum chloride, ammonium chloride and boric acid upon the granules while they are at a temperature above ordinary room temperature, said aluminum chloride being present in amounts within the range of approximately 2-5 pounds on a dry basis, per ton of granules, and said boric acid being present in lesser amounts.

17. Artificially colored roofing granules having a well-bonded, substantially non-alkaline and non-blooming colored surface coating applied in accordance with the method set forth in claim 15.

18. Mineral granules having a well-bonded artificially colored surface coating of which the water-soluble residue does not exceed approximately 7 pounds per ton of aggregate, said coating being substantially non-alkaline and non-blooming and being applied in accordance with the method defined in claim 16.

MAURICE E. BUZZELL.
LAUREN W. KANNINEN.

REFERENCES CITED

The following references are of record in the file of this patent:

UNITED STATES PATENTS

| Number | Name | Date |
|---|---|---|
| 419,657 | Gesner | Jan. 21, 1890 |
| 1,613,758 | Lindstrom | Jan. 11, 1927 |
| 1,698,302 | Goss | Jan. 8, 1929 |
| 1,898,345 | Denning | Feb. 21, 1933 |
| 2,120,773 | Wright | June 14, 1938 |
| 2,139,955 | Hiller | Dec. 13, 1938 |
| 2,276,315 | Kirk | Mar. 17, 1942 |